United States Patent
Weng et al.

(10) Patent No.: US 10,988,009 B1
(45) Date of Patent: Apr. 27, 2021

(54) LIMITING STRUCTURE AND REAR COMPARTMENT COVER SYSTEM FOR PICKUP TRUCK

(71) Applicant: Ningbo Diroan Auto Accessories Co., Ltd., Zhejiang (CN)

(72) Inventors: Rongjie Weng, Zhejiang (CN); Fangliang Weng, Zhejiang (CN)

(73) Assignee: NINGBO DIROAN AUTO ACCESSORIES CO., LTD., Cixi (CN)

(*) Notice: Subject to any disclaimer, the term of this patent is extended or adjusted under 35 U.S.C. 154(b) by 0 days.

(21) Appl. No.: 16/953,747

(22) Filed: Nov. 20, 2020

(30) Foreign Application Priority Data

Oct. 17, 2020 (CN) .......................... 202022314502.5

(51) Int. Cl.
*B60J 7/19* (2006.01)
*B60J 7/14* (2006.01)

(52) U.S. Cl.
CPC .............. *B60J 7/198* (2013.01); *B60J 7/141* (2013.01)

(58) Field of Classification Search
CPC .................................. B60J 7/141; B60J 7/198
USPC ....................................... 296/100.07, 100.09
See application file for complete search history.

(56) References Cited

U.S. PATENT DOCUMENTS

| | | | | |
|---|---|---|---|---|
| 3,923,334 A | * | 12/1975 | Key ....................... | B60J 7/1621 296/10 |
| 6,006,560 A | * | 12/1999 | DeVries ................ | E05B 53/003 292/38 |
| 7,052,071 B2 | * | 5/2006 | Mulder .................. | B60J 7/1621 296/100.06 |
| 8,690,224 B2 | * | 4/2014 | Maimin ................... | B60P 7/02 296/100.09 |
| 9,827,839 B2 | * | 11/2017 | Williamson ............ | B60J 7/198 |
| 10,071,618 B2 | * | 9/2018 | Miyamae ................ | B60R 5/047 |
| 10,189,340 B2 | * | 1/2019 | Schmeichel ............ | B60J 7/141 |
| 10,414,256 B2 | * | 9/2019 | Frederick ................ | B60J 7/198 |
| 10,500,934 B1 | * | 12/2019 | Weng ..................... | B60J 7/1607 |
| 2001/0035664 A1 | * | 11/2001 | Steffens .................. | B60J 7/141 296/100.09 |
| 2016/0200376 A1 | * | 7/2016 | Kerr, III .................. | B60J 7/198 296/100.07 |
| 2017/0240033 A1 | * | 8/2017 | Dylewski, II ........... | B60P 7/02 |
| 2017/0259655 A1 | * | 9/2017 | Dylewski, II ........... | B60J 7/198 |
| 2018/0147926 A1 | * | 5/2018 | Shi .......................... | B60J 7/198 |
| 2019/0100088 A1 | * | 4/2019 | Facchinello ............. | B60J 10/00 |
| 2020/0331329 A1 | * | 10/2020 | Schmeichel ............ | B60J 7/141 |
| 2020/0376944 A1 | * | 12/2020 | Facchinello ............ | B60J 7/198 |

FOREIGN PATENT DOCUMENTS

CN     201534517 U     7/2010

* cited by examiner

*Primary Examiner* — Jason S Morrow
(74) *Attorney, Agent, or Firm* — Brinks Gilson & Lione

(57) ABSTRACT

A limiting structure and a rear compartment cover system for a pickup truck are described. The limiting structure includes a mounting base, two limiting blocks separately arranged on two sides of the mounting base, a pulling member driving the two limiting blocks to retract toward the mounting base, and a springback member driving the limiting blocks to extend in a direction away from the mounting base always, the two limiting blocks being both movably connected to the mounting base. This application has effects of convenient and fast operations and being convenient to take out goods from or place goods in the compartment.

13 Claims, 13 Drawing Sheets

LIMITING STRUCTURE AND REAR COMPARTMENT COVER SYSTEM FOR PICKUP TRUCK

RELATED APPLICATION

This application claims priority to Chinese Patent Application No. 202022314502.5, filed on Oct. 17, 2020, which is incorporated herein by reference in its entirety.

BACKGROUND

Technical Field

The present disclosure relates to the field of non-fixed roofs of vehicles, and in particular to a limiting structure and a rear compartment cover system for a pickup truck.

Related Art

A pickup truck is a car that uses a car head and a cab, and has an opening truck compartment. Goods placed in the rear compartment are likely to be exposed to the sun and rain. In view of this, a compartment cover that covers the upper opening of the rear compartment is mounted at the rear compartment of the pickup truck to protect the goods in the compartment.

Currently, the common compartment cover is formed by foldable connection of a plurality of cover plates. When in usage, the plurality of cover plates are laid flat on the upper opening of the compartment, and top ends of two opposite side walls in the compartment are fixedly provided with frame edges that overhang and protrude into the compartment and that are used for fixing the compartment cover. A cover plate near the head of the car is fixed to the frame edges, and a cover plate near the rear of the car is detachably connected to the frame edges through a limiting structure. For example, for a locking mechanism for a compartment cover of a pickup truck, when the locking mechanism is in usage, a mounting strip is mounted on a bottom surface of the compartment cover; a locking grip may slide along a chute, so that a position may be adjusted; and when locking is needed, a grip body of the grip is rotated upward. Since a head of the grip body is arc-shaped, the rotation of the grip body may drive a locking block to move upward and closely adhere to the compartment of the pickup truck, thereby achieving the purpose of locking.

For the foregoing related technology, there are at least some problems/issues associated with the existing limiting structure, for example but not limited to, being troublesome for people to operate during usage. There is a disadvantage that it is relatively inconvenient to take out or place goods when opening or closing the compartment cover since the locking mechanisms on two sides need to be opened or locked in turn. The present disclosure describes a limiting structure and rear compartment cover system, adding at least one or more of the problems/issues discussed above.

SUMMARY

To facilitate a closing operation of a compartment cover during usage, this present disclosure provides a limiting structure and a rear compartment cover system for a pickup truck.

According to a first aspect, this present disclosure provides a limiting structure and adopts the following technical solution.

A limiting structure includes a mounting base, two limiting blocks separately arranged on two sides of the mounting base, a pulling member or a pulling component driving the two limiting blocks to retract toward the mounting base, and a springback member or a springback mechanism driving the limiting blocks to extend in a direction away from the mounting base always, and the two limiting blocks are both movably connected to the mounting base.

By adopting the foregoing technical solution, the mounting base is mounted on two sides of a bottom surface of a compartment cover. Under a normal state, the two limiting blocks extend out of the two sides of the mounting base, so that a part of the limiting block extending out of the mounting base is limited on a lower side of a frame edge that is mounted on an upper end of the compartment, to limit the compartment cover. When the compartment cover needs to be opened, the pulling component is pulled to drive the two limiting blocks to retract toward the mounting base, that is, the part of the limiting block extending out of the mounting base is separated from the frame edge, and the compartment cover may be opened. When the compartment cover needs to be closed, provided that the pulling component is loosened, two limiting blocks extend out to the lower side of the frame edge under the action of the springback mechanism, to close and fix the compartment cover. The foregoing operation is convenient and fast, and the limiting blocks on the two sides may be limited and fixed through a single-hand pull, which is convenient to take out goods from or place goods in the compartment.

Optionally and/or preferably, the pulling component includes a handle rotatably mounted on the mounting base and a pull rope connected to the handle, the handle is rotatably mounted on the mounting base, the pull rope is connected to the handle, and two ends of the pull rope are respectively connected to the two limiting blocks.

By adopting the foregoing technical solution, since the pull rope is connected to the handle, the pull rope rotates with the handle when the handle rotates, and is wound around the handle during the stretching and rotating process, thereby driving two ends of the pull rope to move toward each other, and realizing retraction of the two limiting blocks toward the mounting base. The two limiting blocks may be retracted by only rotating the handle, so that the limiting blocks are separated and unlocked from the frame edge. The operation is very convenient.

Optionally and/or preferably, the handle includes a rotating block and a grip connected to a side wall of the rotating block and overhanging outward, the rotating block is rotatably mounted inside the mounting base, the rotating block is provided with a strip-shaped pull rope limiting channel that penetrates the rotating block along a length direction of the pull rope, and the pull rope partially passes through the pull rope limiting channel.

By adopting the foregoing technical solution, the pull rope passes through the pull rope limiting channel. When the grip is held to rotate, the rotating block rotates, and the pull rope extending from the two ends of the pull rope limiting channel twists with the rotating block and is wound around the rotating block, thereby driving the limiting blocks on the two ends of the pull rope to move toward the mounting base and retract. The arrangement of the grip makes the operation convenient, the connection structure of the pull rope and the rotating block is simple, and the installation is convenient.

Optionally and/or preferably, the mounting base includes two limiting bases and a rotating base located between the two limiting bases, the limiting base is provided with a limiting cavity that penetrates two sides and is used to mount the limiting block, the rotating base is provided with a rotating cavity that penetrates two sides and is used to mount the rotating block of the handle, the rotating cavity and two limiting cavities are arranged coaxially, a bottom surface of the rotating cavity is vertically provided with a connecting shaft, the rotating block of the handle is rotatably connected to the connecting shaft to make the rotating block rotate around the connecting shaft, and a side wall of the rotating base that is axially parallel to the connecting shaft is provided with a side hole from which the grip of the handle extends out.

By adopting the foregoing technical solution, the two limiting bases are fixedly connected to the two ends of the bottom surface of the compartment cover, and the handle extends out of the mounting base from the side hole of the rotating cavity, which is convenient for people to hold and use. The arrangements of the rotating cavity of the rotating base and the limiting cavity of the limiting base facilitate the installation of the handle and the limiting block.

Optionally and/or preferably, an end of the limiting block that is close to the rotating base is rotatably connected to the limiting base, an end that is away from the rotating base is set as a limiting end capable of extending out of or retracting to the limiting cavity, and an end of the pull rope is connected to a part on the limiting block close to the limiting end.

By adopting the foregoing technical solution, when the handle is rotated to pull the pull rope, the end of the pull rope drives the limiting block to rotate, thereby driving the limiting end to rotate and extend out of the limiting cavity or rotate and retract to the limiting cavity, and realizing the limiting, fixing, and unlocking between the limiting block and the frame edge.

Optionally and/or preferably, an end of the limiting block that is close to the rotating base is slidably connected to the limiting base along the length direction of the pull rope, an end that is away from the rotating base is set as a limiting end capable of extending out of or retracting to the limiting cavity, and an end of the pull rope is connected to a part on the limiting block close to the limiting end.

By adopting the foregoing technical solution, when the handle is rotated to pull the pull rope, the end of the pull rope drives the limiting block to slide in a direction toward the rotating base, thereby driving the limiting end to slide and extend out of the limiting cavity or slide and retract to the limiting cavity, and realizing the limiting, fixing, and unlocking between the limiting block and the frame edge.

Optionally and/or preferably, the springback mechanism includes a spring and a spring stopper, the spring stopper is disposed on a side of the limiting block that is close to the rotating base, an end of the pull rope that is away from the handle movably passes through the spring stopper to fixedly connect to the limiting block, the spring is sleeved on the pull rope, and two ends of the spring respectively abut against the spring stopper and the limiting block.

By adopting the foregoing technical solution, when the limiting end of the limiting block is driven to move to the limiting cavity by rotating the handle and pulling the pull rope, the spring retracts. When the handle is released, the limiting block moves under the action of the resilience force of the spring to make the limiting end extend out of the limiting base to cooperate with the frame edge in limiting. The structure of the springback mechanism is simple, and the installation is convenient.

Optionally and/or preferably, the springback mechanism further includes a torsion spring, a body of the torsion spring is rotatably sleeved on the connecting shaft and is located between the connecting shaft and the rotating block, a connecting leg of the torsion spring is fixedly connected to the rotating block, and the other connecting leg of the torsion spring is fixedly connected to the connecting shaft.

By adopting the foregoing technical solution, under a normal state of the torsion spring, a length direction of the pull rope limiting channel on the rotating block is consistent with a length direction of the pull rope. Design of the torsion spring improves a springback effect of the limiting block after the handle is released.

Optionally and/or preferably, two ends of the rotating base are respectively connected to two opposite ends of the two limiting bases, so that the rotating cavity communicates with the limiting cavities of the two limiting blocks.

By adopting the foregoing technical solution, the rotating base and the two limiting bases are fixedly connected to enhance a structural strength of the mounting base.

Optionally and/or preferably, the rotating base includes a first half housing and a second half housing that are aligned and fixedly connected, one end of the connecting shaft is vertically and fixedly connected to a bottom wall of the first half housing, and the other end of the connecting shaft extends toward the second half housing.

By adopting the foregoing technical solution, the first half housing and the second half housing are aligned to form the rotating base, so that the handle and the pull rope may be conveniently operated during installation.

Optionally and/or preferably, the rotating base further includes two connecting blocks, the connecting blocks are provided with insertion cavities along an axial direction of the rotating cavity, two ends of the first half housing and the second half housing that are aligned are respectively inserted into the insertion cavities of the two connecting blocks, and an end of each connecting block that is away from the rotating base is inserted with an end of the limiting base that faces the rotating base.

By adopting the foregoing technical solution, the first half housing and the second half housing are inserted and fixed by using the connecting blocks, so that a screw connection is eliminated when the first half housing and the second half housing are connected, and the installation is more convenient and fast.

Optionally and/or preferably, two handles are provided, the two handles are spaced apart by a particular distance and rotatably mounted on the rotating base, and the pull rope is connected to the two handles.

By adopting the foregoing technical solution, through the arrangement of the two handles, according to people's usage habits, the two handles may be simultaneously pulled and used or only one handle may be used to drive the pull rope to move, which is convenient for people to use.

According to a second aspect, this present disclosure provides a rear compartment cover system for a pickup truck and adopts the following technical solution.

A rear compartment cover system for a pickup truck includes a plurality of cover plates connected in turn by using a folding mechanism, a bottom surface of each of the cover plates being provided with the foregoing limiting structure that is used to connect to a rear compartment frame edge for limiting.

By adopting the foregoing technical solution, a bottom surface of each cover plate is provided with the limiting structure. When a part of the cover plate is folded, each cover plate still covering the rear compartment is limited by the limiting structure, which solves the existing problem that the remaining cover plate of the compartment cover is disconnected from the rear compartment when a part of the cover plate is folded, so that the rear compartment cover system is stable in usage.

Optionally and/or preferably, the folding mechanism includes a strip-shaped folding connecting portion that is bendable in a width direction and cover plate sealing strips that are respectively and integrally connected to two long sides of the folding connecting portion, opposite sides of two adjacent cover plates are provided with sealing cavities corresponding to the cover plate sealing strips, and the two cover plate sealing strips are respectively and correspondingly embedded in the sealing cavities on the two adjacent cover plates.

By adopting the foregoing technical solution, a cooperation between the cover plate sealing strips and the sealing cavities enables a joint between the two cover plates to be sealed. When the cover plates are in usage, rain water or dust is prevented from entering the rear compartment, which has a better protective effect. The bendable arrangement of the folding connecting portion facilitates folding between two adjacent cover plates.

Optionally and/or preferably, the folding connecting portion includes a rubber sheet body, and two long sides of the rubber sheet body are respectively and integrally connected to the two cover plate sealing strips.

By adopting the foregoing technical solution, the folding connecting portion made of a rubber material is integrally connected to the cover plate sealing strip, which is convenient for folding and has a good sealing effect.

Optionally and/or preferably, the folding connecting portion includes a strip-shaped connecting plate and connecting sealing strips that are respectively and hermetically connected to the two long sides, two long sides of the connecting plate are respectively provided with sealing embedding grooves, the connecting sealing strip includes a folding portion and a sealing portion that is connected to a side of the folding portion, the other side of the folding portion is integrally connected to the cover plate sealing strip, and the sealing portion is correspondingly embedded in the sealing embedding groove.

By adopting the foregoing technical solution, due to the arrangement of the connecting plates, there is a certain gap between the two adjacent cover plates after the two cover plates are folded, so that the two cover plates may be placed vertically after being folded, which saves the space above the rear compartment.

Optionally and/or Optionally and/or preferably, the sealing cavity is a long groove that is disposed on a side wall of the cover plate and that has an opening facing upward, the opening is provided with a baffle that is fixedly connected to the cover plate, there is a gap between a side groove wall of the long groove that is away from the cover plate and the baffle, the cover plate sealing strip is embedded in the long groove, and the folding connecting portion is integrally connected to the cover plate sealing strip through the gap.

By adopting the foregoing technical solution, the sealing cavity is a long groove, and through the arrangement of the baffle, the cover plate sealing strip is tightly limited in the sealing cavity, thereby improving the sealing effect.

Figure 1:
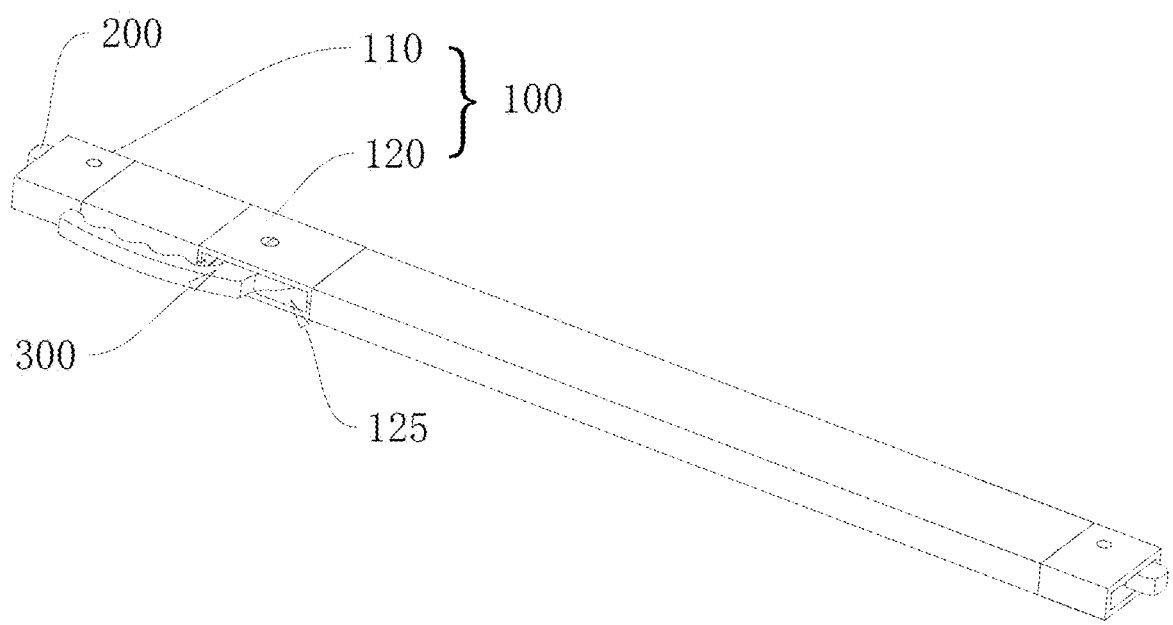
FIG. 1 is a schematic structural diagram of Embodiment 1.

In the figures: 100, mounting base; 110, limiting base; 111, pin shaft; 120, rotating base; 121, first half housing; 122, second half housing; 123, connecting block; 124, insertion portion; 1231, insertion cavity; 125, side hole; 126, connecting shaft; 200, limiting block; 210, connecting hole; 220, limiting end; 300, pulling component; 320, handle; 310, pull rope; 321, rotating block; 3211, pull rope limiting channel; 322, grip; 400, springback mechanism; 410, spring; 420, spring stopper; 430, torsion spring; 421, pull rope through hole; 431, body; 432, first clamp groove; 433, second clamp groove; 434, connecting leg; 500, frame edge; 600, cover plate; 700, folding mechanism; 701, first folding connecting component; 702, second folding connecting component; 710, folding connecting portion; 712, connecting plate; 713, connecting sealing strip; 714, sealing embedding groove; 7131, sealing portion; 715, baffle; 720, cover plate sealing strip; 730, sealing cavity; 800, support structure; 801, support bar; 802, mounting block; 803, locking knob; 804, locking block.

DETAILED DESCRIPTION

The disclosed systems and methods will now be described in detail hereinafter with reference to the accompanied drawings, which form a part of the present application, and which show, by way of illustration, specific examples of embodiments. Please note that the systems and methods may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosed system and methods may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter may include combinations of exemplary embodiments in whole or in part. Moreover, the phrase "in one implementation", "in another implementation", or "in some implementations" as used herein does not necessarily refer to the same implementation or different implementation. It is intended, for example, that claimed subject matter may include combinations of the disclosed features from the implementations in whole or in part.

In general, terminology may be understood at least in part from usage in context. For example, terms, such as "and", "or", or "and/or," as used herein may include a variety of meanings that may depend at least in part upon the context in which such terms are used. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present utility model is described below in detail with reference to FIG. 1 to FIG. 13.

Embodiment 1

Figure 3:
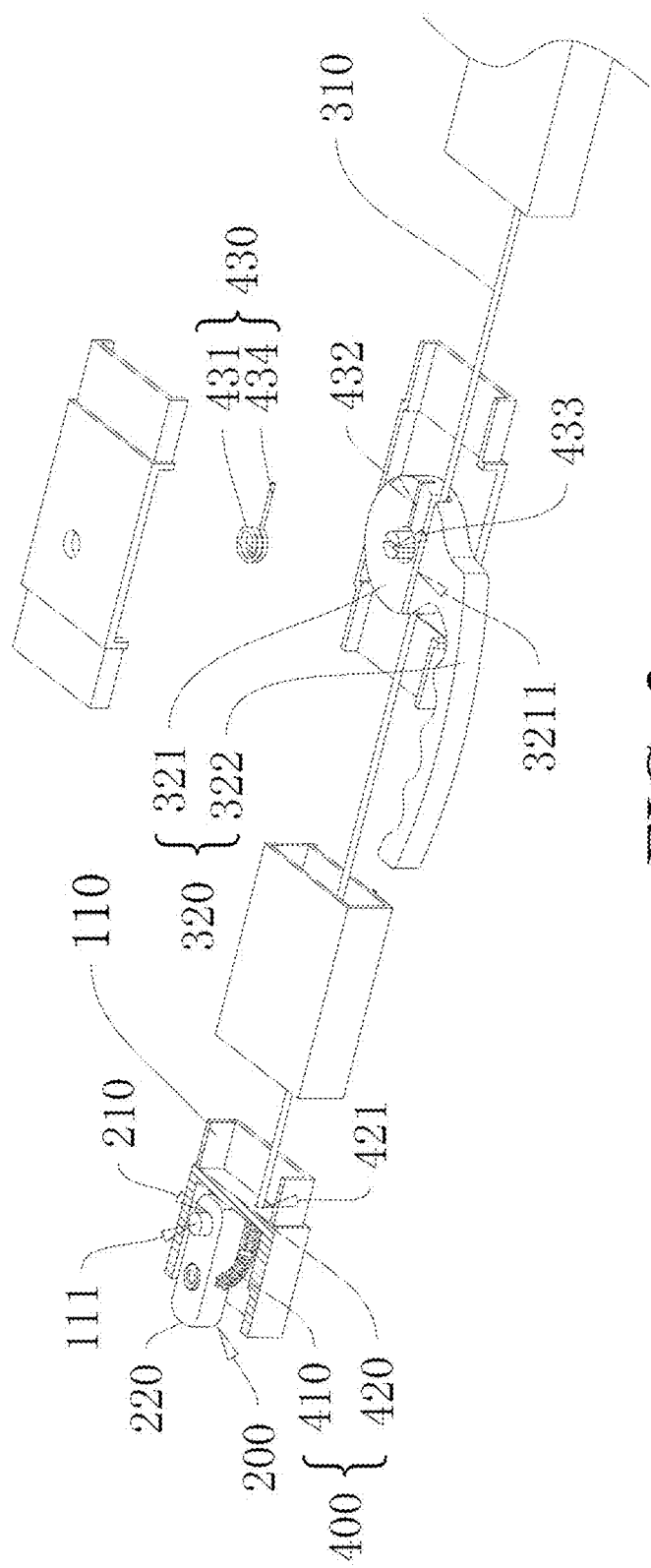
FIG. 3 is a schematic diagram of a connection between a mounting base and a springback mechanism, and a connection between a limiting block and a pulling component in Embodiment 1.

Referring to FIG. 1 and FIG. 3, this embodiment of the present disclosure discloses a limiting structure, including a mounting base 100, two limiting blocks 200, a pulling component 300, and a springback mechanism 400. The two limiting blocks 200 are respectively and movably arranged on two sides of the mounting base 100, the pulling component 300 is mounted inside the mounting base 100, two springback mechanisms 400 are provided and respectively and correspondingly connected to the two limiting blocks 200, and the springback mechanisms 400 drive the limiting blocks 200 to extend in a direction away from the mounting base 100 always.

The mounting base 100 includes two limiting bases 110 and a rotating base 120 located between the two limiting bases 110, the limiting base 110 is provided with a limiting cavity that laterally penetrates two sides, the rotating base 120 is provided with a rotating cavity that penetrates two sides, the penetrating directions of the rotating cavity and the two limiting cavities are arranged coaxially, and when two ends of the rotating base 120 are respectively connected to two opposite ends of the two limiting bases 110, the rotating cavity communicates with the limiting cavities of the two limiting blocks 200.

Figure 2:
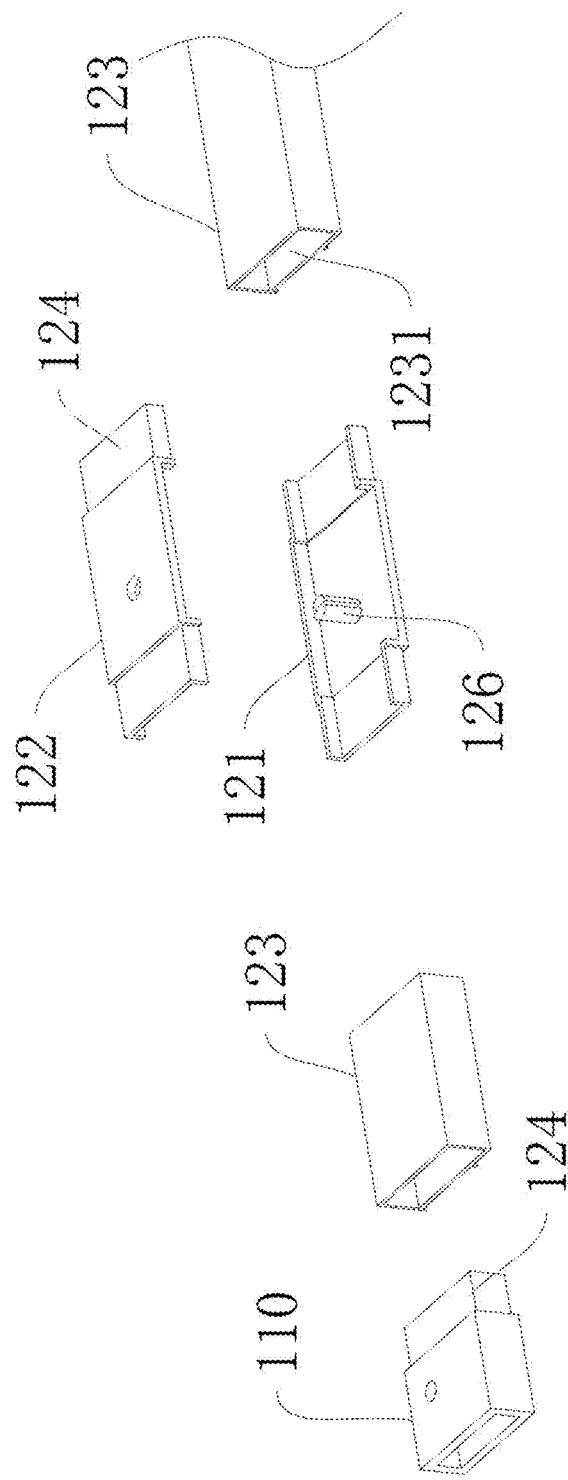
FIG. 2 is a schematic exploded diagram of a mounting base in Embodiment 1.

Referring to FIG. 1 and FIG. 2, the rotating base 120 includes a first half housing 121 and a second half housing 122 that are aligned and fixedly connected and two connecting blocks 123. After the first half housing 121 and the second half housing 122 are aligned, a cuboid tube having a hollow cavity is formed, the two connecting blocks 123 are respectively connected to two ends of the cuboid tube, two ends of an outer wall of the cuboid tube are provided with insertion portions 124 having a step structure, the connecting block 123 is provided with an insertion cavity 1231 that penetrates along an axial direction of the rotating cavity, the two insertion portions 124 of the cuboid tube are respectively and correspondingly inserted into ends of the insertion cavities 1231 of the two connecting blocks 123 that are close to the cuboid tube, the first half housing 121 and the second half housing 122 are directly aligned and fixed through the insertion cooperation between the two connecting blocks 123 and the cuboid tube, thereby eliminating a screw connection and making the installation more convenient.

The first half housing 121 and the second half housing 122 are provided with through grooves on side walls on the same side. When the first half housing 121 and the second half housing 122 are aligned to form the cuboid tube, the two through grooves correspondingly form a side hole 125 on the side wall of the cuboid tube. An inner wall of the first half housing 121 is vertically provided with a connecting shaft 126, and the second half housing 122 is provided with a positioning hole corresponding to the connecting shaft 126. When the first half housing 121 and the second half housing 122 are aligned to form the cuboid tube, an end of the connecting shaft 126 that is away from the first half housing 121 extends into the positioning hole of the second half housing 122 but does not extend out of the second half housing 122.

Referring to FIG. 1, FIG. 2, and FIG. 3, the pulling component 300 includes a handle 320 and a pull rope 310, the handle 320 includes a rotating block 321 mounted inside the cuboid tube and a grip 322 connected to a side wall of the rotating block 321 and overhanging outside the cuboid tube, the rotating block 321 is a cylindrical block and is provided with a center through hole, and the rotating block 321 is sleeved on the connecting shaft 126 through the center through hole, so that the rotating block 321 may rotate around the connecting shaft 126, and the grip 322 passes through the side hole 125 and is located outside the cuboid tube.

Referring to FIG. 2, outer walls of opposite ends of the two limiting bases 110 are also provided with step-shaped insertion portions 124 that cooperate with the insertion cavities 1231 of the connecting blocks 123, and the respective insertion portions 124 of the two limiting bases 110 are respectively and correspondingly inserted into ends of the respective insertion cavities 1231 of the two connecting blocks 123 that are away from the rotating base 120.

Referring to FIG. 2 and FIG. 3, the pull rope 310 is arranged along a length direction of the cuboid tube and penetrates through the rotating cavity and the limiting cavity, the rotating block 321 is provided with a strip-shaped pull rope limiting channel 3211 that laterally penetrates the rotating block 321 along the length direction of the pull rope 310, a part of the pull rope 310 that passes through the rotating block 321 is limitedly embedded in the pull rope limiting channel 3211, the two ends of the pull rope 310 are respectively connected to the side walls of the two limiting blocks 200, and when the rotating block 321 rotates, the rotating block 321 drives the pull rope 310 to twist, so that the pull rope 310 is wound around the side wall of the rotating block 321, thereby driving the two ends of the pull rope 310 to retract in a direction toward the rotating block 321.

Referring to FIG. 2 and FIG. 3, the side wall of the limiting cavity of the limiting base 110 is provided with a pin shaft 111, an axial direction of the pin shaft 111 is parallel to an axial direction of the connecting shaft 126, one end of the limiting block 200 is provided with a connecting hole 210, the limiting block 200 is sleeved on the pin shaft 111 through the connecting hole 210, and the other end of the limiting block 200 is set as a limiting end 220, so that the limiting block 200 may rotate around the pin shaft 111, and the limiting end 220 may extend out of or retract to the limiting cavity. In another embodiment, an end of the limiting block 200 that is close to the rotating base 120 is slidably connected to the limiting base 110 along the length direction of the pull rope 310, an end that is away from the rotating base 120 is set as a limiting end 220 that may extend out of or retract to the limiting cavity. When the limiting block 200 and the limiting base 110 slide, the limiting end 220 of the limiting block 200 may extend out of or retract to the limiting cavity.

Referring to FIG. 3, the springback mechanism 400 includes a spring 410, a spring stopper 420, and a torsion spring 430, the spring stopper 420 is disposed on a side of the limiting block 200 that is close to the rotating base 120, the spring stopper 420 is perpendicular to and integrally connected to a cavity wall of the limiting cavity of the limiting base 110, the spring stopper 420 is provided with a pull rope through hole 421, an axis of the pull rope through hole 421 coincides with a lengthwise extension line of the pull rope limiting channel 3211, an end of the pull rope 310 that is away from the handle 320 movably passes through the spring stopper 420 and is fixedly connected to a side wall of the limiting block 200 that is close to the limiting end 220, the spring 410 is sleeved on the pull rope 310, and two ends of the spring 410 respectively abut against the spring stopper 420 and the limiting block 200.

A body 431 of the torsion spring 430 is rotatably sleeved on the connecting shaft 126 and embedded between the connecting shaft 126 and the rotating block 321, the rotating block 321 is provided with a first clamp groove 432 that communicates with a center through hole of the rotating block 321, the connecting shaft 126 is radially provided with a second clamp groove 433, a connecting leg 434 of the torsion spring 430 is limitedly connected to the first clamp groove 432 of the rotating block 321, and the other connecting leg 434 of the torsion spring 430 is limitedly connected to the second clamp groove 433 of the connecting shaft 126.

When this embodiment is in usage, the limiting structure is fixedly mounted on the bottom of each cover plate 600 of the compartment cover along the length direction of the cover plate 600, so that the limiting ends 220 of the two limiting blocks 200 are limited on the bottom of a rear compartment frame edge 500 to play a role of limiting and fixing; when the compartment cover is to be opened, the grip 322 is pulled to make the grip 322 rotate, which drives the rotating block 321 to rotate, thereby driving the pull rope 310 to be wound around the rotating block 321, and making the two ends of the pull rope 310 retract in the direction toward the mounting base 100, that is, driving the limiting block 200 to rotate, and making the limiting end 220 retract to the limiting cavity, so that the limiting end 220 is separated from the bottom of the frame edge 500, and the compartment cover may be opened.

Embodiment 2

Figure 4:
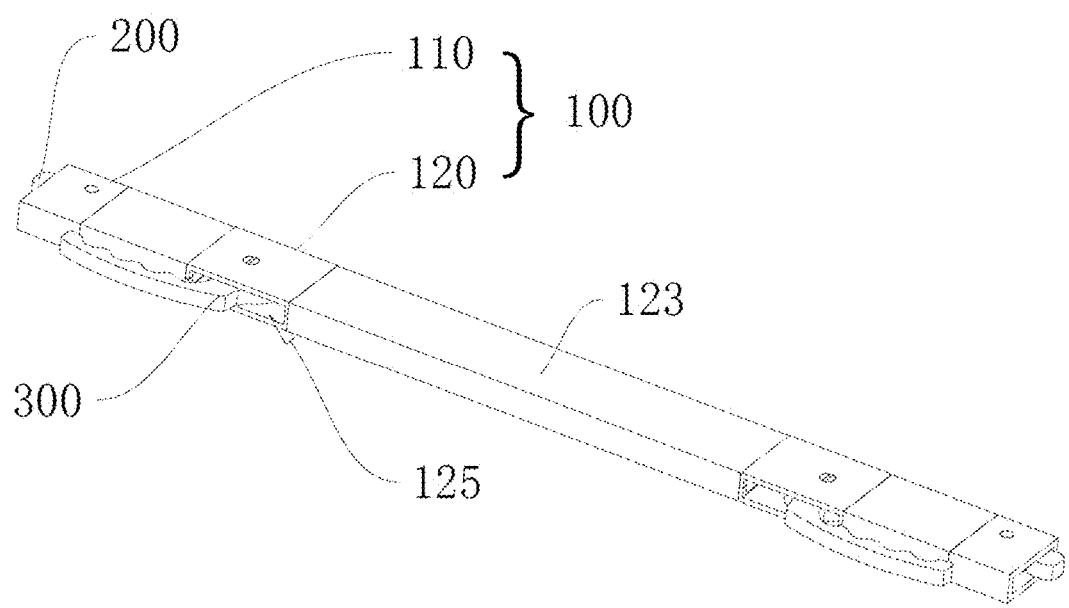
FIG. 4 is a schematic structural diagram of Embodiment 2.

Referring to FIG. 4, a difference between this embodiment and Embodiment 1 is that there are two handles 320 and two rotating bases 120 are provided in turn. A structure of the rotating base 120 is the same as a structure of the rotating base 120 in Embodiment 1, the two handles 320 are rotatably mounted in cuboid tubes of the two rotating bases 120 respectively in a one-to-one correspondence, two connecting blocks 123 between the two cuboid tubes are connected as a whole. This arrangement has a high structural strength, and the pull rope 310 is connected to the two handles 320 in turn.

Embodiment 3

Figure 5:
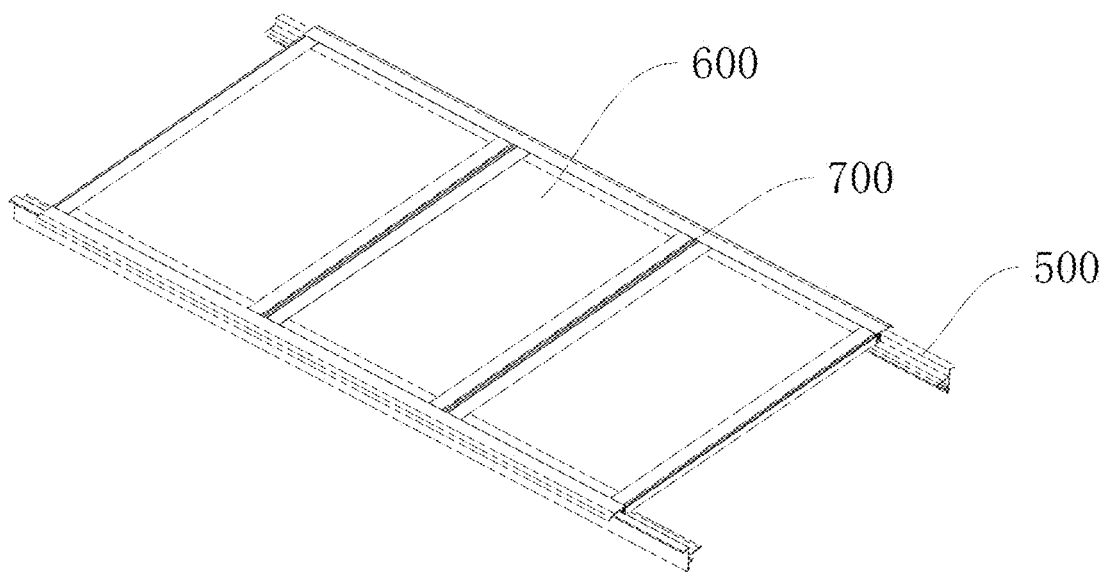
FIG. 5 is a schematic structural diagram of Embodiment 3.
Figure 6:
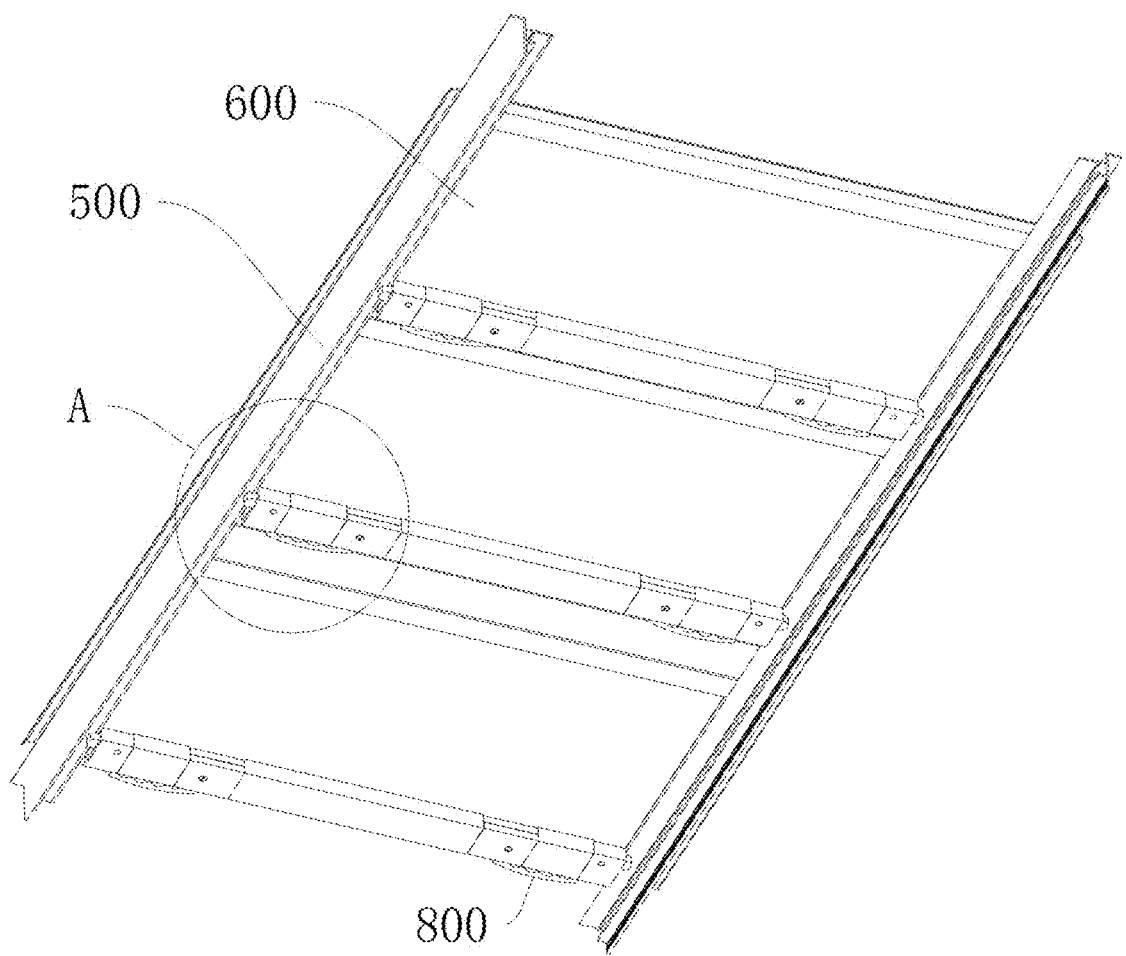
FIG. 6 is a schematic structural diagram of Embodiment 3 from another direction.
Figure 7:
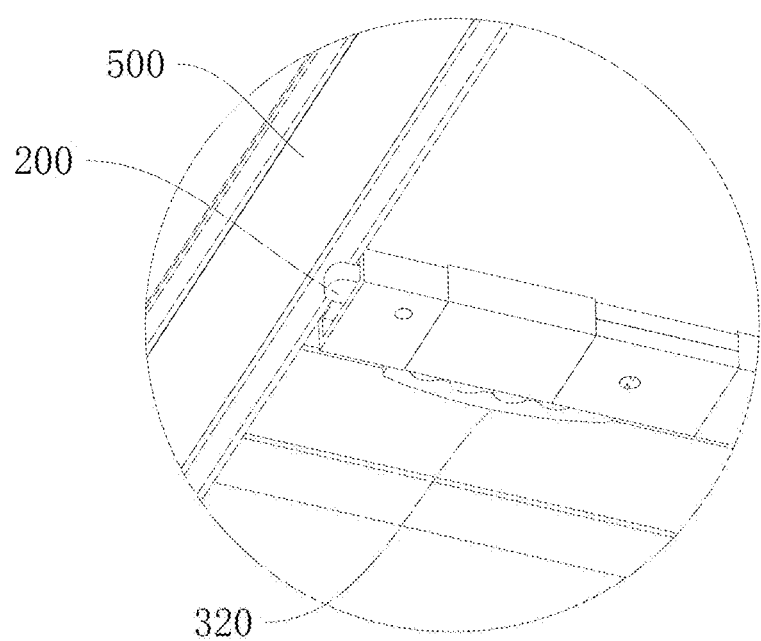
FIG. 7 is an enlarged diagram of a part A in FIG. 6.

Referring to FIG. 5 to FIG. 7, a rear compartment cover system for a pickup truck includes a plurality of cover plates 600 connected in turn by using a folding mechanism 700, each of the cover plates 600 includes a rectangular plate body and a fixed frame surrounding side walls around the rectangular plate body, and a bottom surface of each of the cover plates 600 is provided with the limiting structure according to either of Embodiment 1 and Embodiment 2 that is used to abut against a rear compartment frame edge 500 for limiting.

Figure 8:
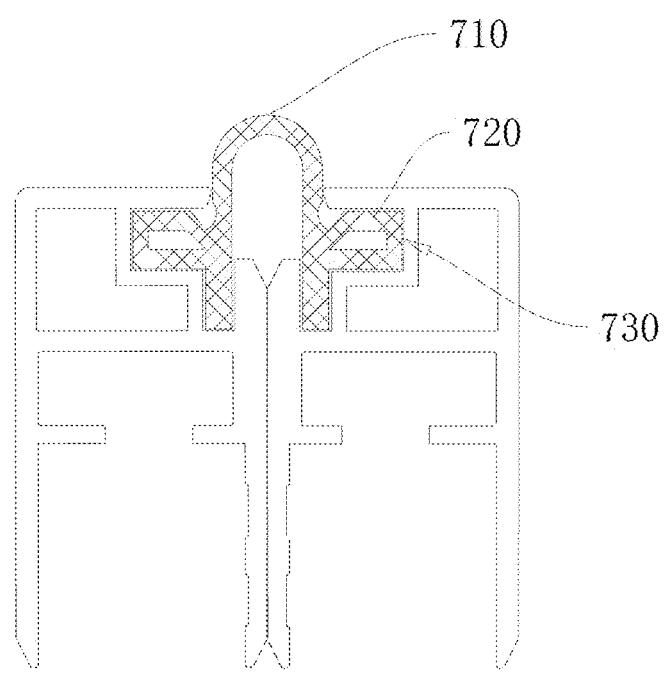
FIG. 8 is a schematic structural diagram of a folding part of each cover plate in Embodiment 3.
Figure 9:
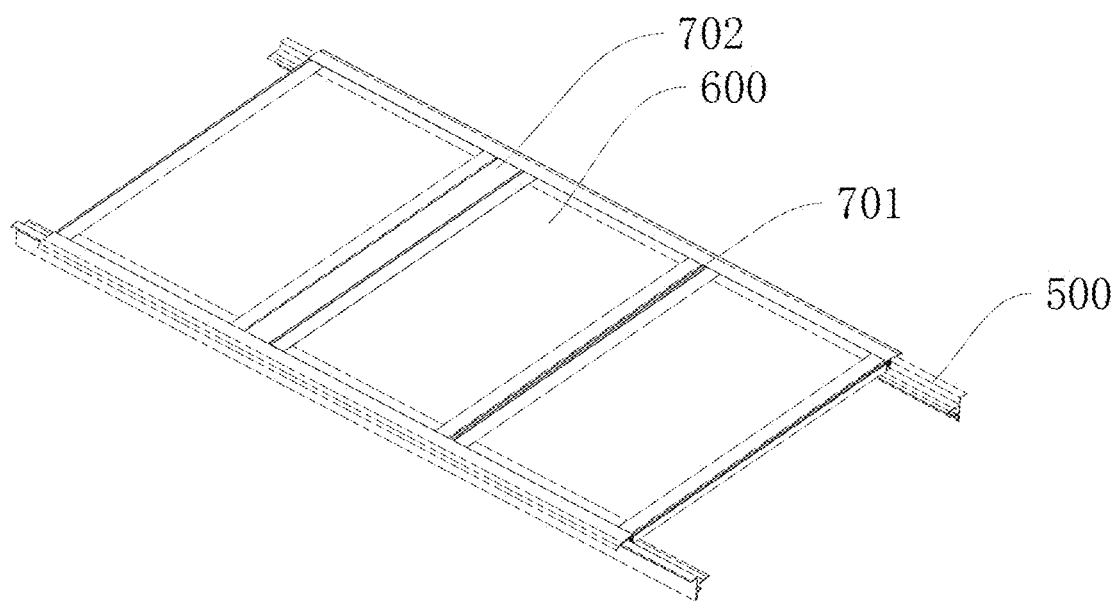
FIG. 9 is a schematic structural diagram of Embodiment 4.
Figure 10:
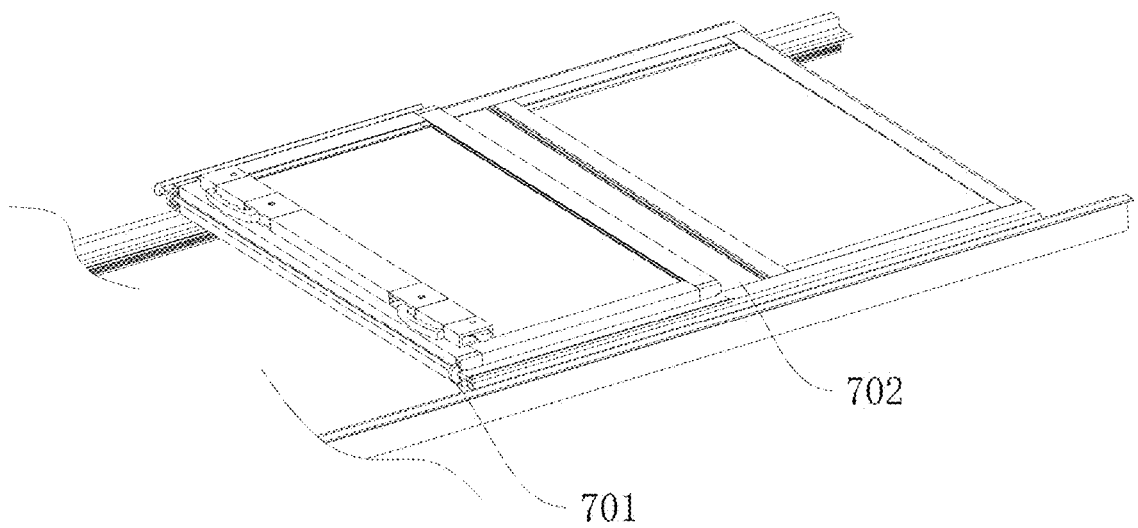
FIG. 10 is a schematic structural diagram of Embodiment 4 with one of cover plates opened.
Figure 11:
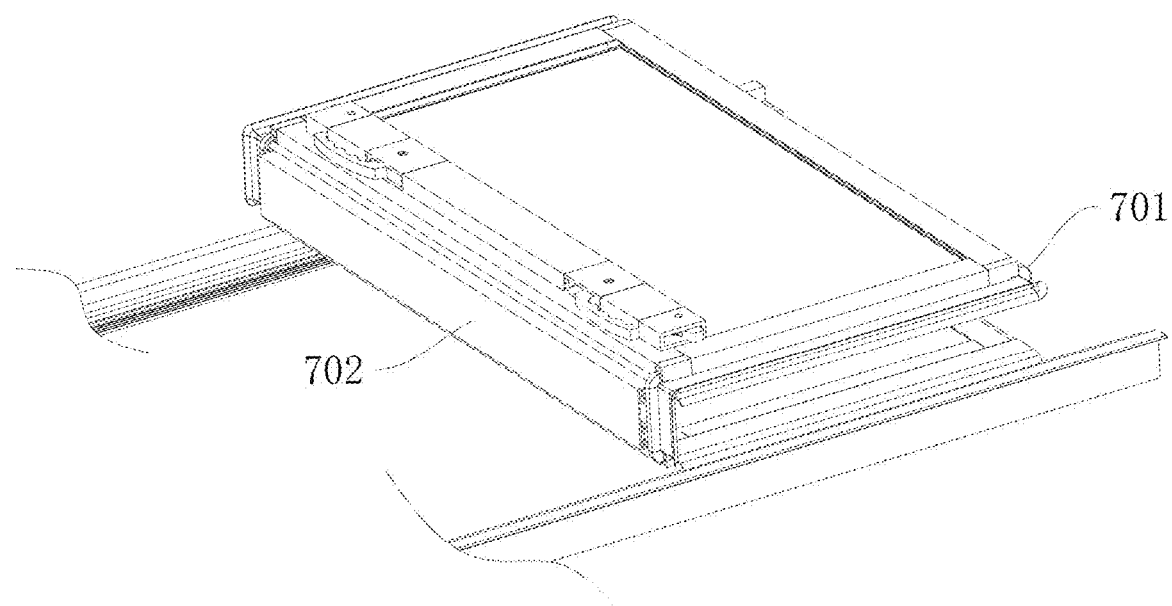
FIG. 11 is a schematic structural diagram of Embodiment 4 with two cover plates opened.
Figure 12:
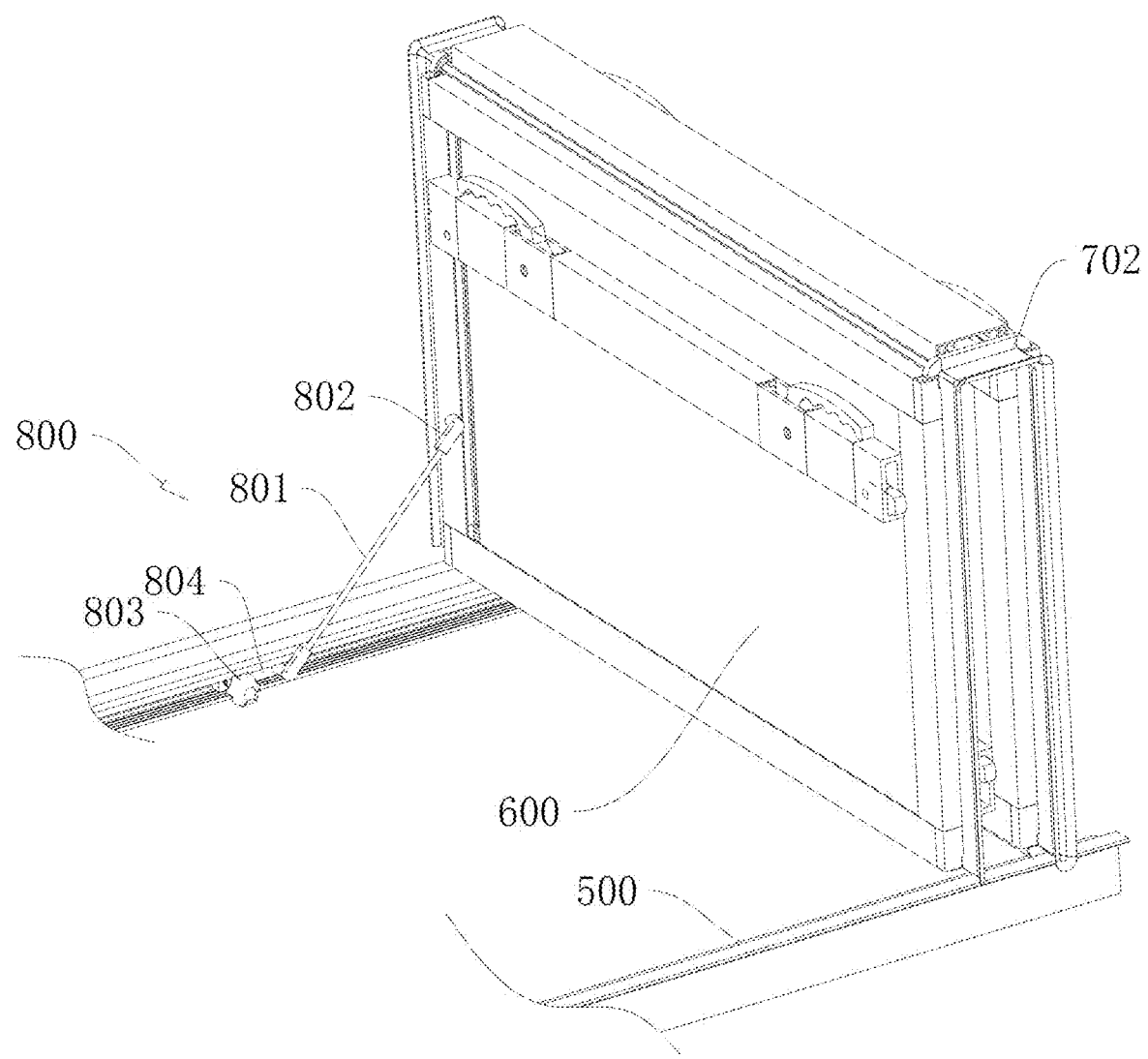
FIG. 12 is a schematic structural diagram of Embodiment 4 with three cover plates opened.
Figure 13:
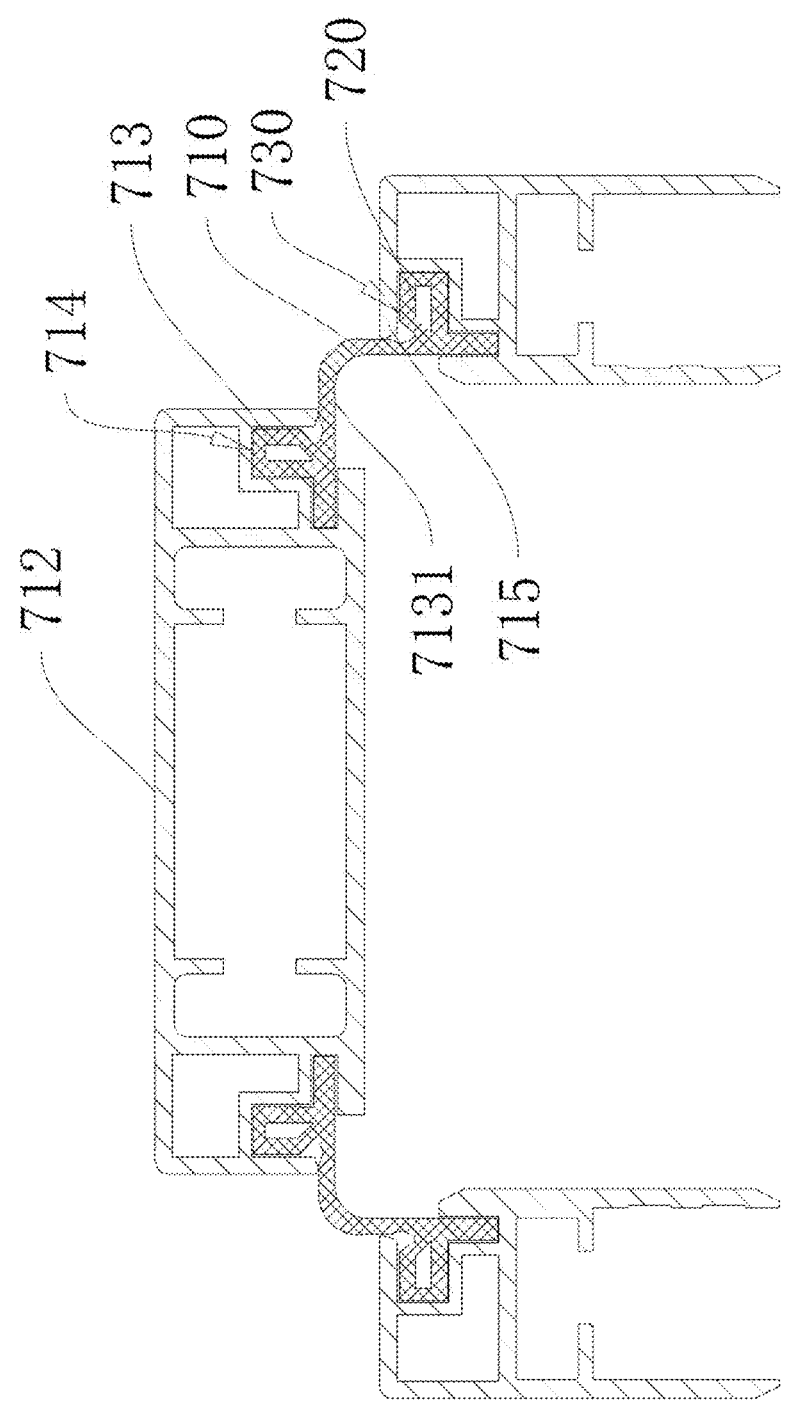
FIG. 13 is a schematic structural diagram of a second folding connecting component in Embodiment 4.

Referring to FIG. 8, the folding mechanism 700 is a first folding connecting component, the first folding connecting component includes a strip-shaped folding connecting portion 710 that is bendable in a width direction and cover plate sealing strips 720 that are respectively and integrally connected to two long sides of the folding connecting portion 710, opposite sides of the fixed frames of the two adjacent cover plates 600 are provided with sealing cavities 730 corresponding to the cover plate sealing strips 720, the two cover plate sealing strips 720 are respectively and correspondingly embedded in the two relatively close sealing cavities 730 of the two adjacent cover plates 600. The folding connecting portion 710 may be made of one or more flexible material, for example but not limited to, the folding connecting portion 710 may be a rubber sheet body. The cover plate sealing strips 720 may also be made of one or more flexible material, for example but not limited to, the cover plate sealing strips 720 may be made of a rubber material.

In the rear compartment cover system for a pickup truck in this embodiment, three cover plates 600 are connected in turn by using the first folding connecting component, and are laid flat to seal the top opening of the rear compartment cover of the pickup truck. In this case, the limiting block 200 of the limiting structure on the bottom of each of the cover plates 600 extends out of the limiting base 110, and a top surface of the limiting block 200 abuts against the bottom of the rear compartment cover frame edge 500 to play a role of limiting, so that the cover plate 600 may stably seal the opening of the rear compartment cover of the pickup truck. The three cover plates 600 are set as a first cover plate, a second cover plate, and a third cover plate in turn from the rear to the front of the pickup truck. When the rear compartment cover system is to be opened, the handle 320 at the bottom of the first cover plate is rotated to make the limiting block 200 retract to the limiting base 110, and the first cover plate may be turned over by 180 degrees, so that the first cover plate is stacked on the top of the second cover plate, and then the handle 320 at the bottom of the second cover plate is rotated. Similarly, the first cover plate and the second cover plate that are stacked together may be turned over at the same time, so that the first cover plate and the second cover plate are simultaneously stacked on the top of the third cover plate. Finally, the three cover plates 600 that are stacked together continue to be turned over, so that the three cover plates 600 are all placed vertically and accommodated on the top of the rear compartment cover that is close to the front of the vehicle, thereby increasing the size of the opening of the rear compartment cover and helping people to take out or place goods.

Embodiment 4

Referring to FIG. 9 to FIG. 13, a rear compartment cover system for a pickup truck includes a plurality of cover plates 600 connected in turn by using a folding mechanism 700, each of the cover plates 600 includes a rectangular plate body and a fixed frame surrounding side walls around the rectangular plate body, and a bottom surface of each of the cover plates 600 is provided with the limiting structure according to either of Embodiment 1 and Embodiment 2 that is used to abut against a rear compartment frame edge 500 for limiting. A support structure 800 includes a support bar 801, a mounting block 802, and a locking block 804, the mounting block 802 is fixed to a fixed frame at the bottom of the cover plate 600 near a direction of the front of the pickup truck, the locking block 804 is slidably mounted along the rear compartment frame edge 500, two ends of the support bar 801 are respectively and movably hinged to the mounting block 802 and the locking block 804, the locking block 804 is further provided with a locking knob 803, and a screw rod of the locking knob 803 passes through the locking block 804 to be in threaded connection to the rear compartment frame edge 500. When the locking knob 803 is tightened, the locking block 804 is fixed to the rear compartment frame edge 500, which may position and support the cover plate 600. When the locking knob 803 is loosened, the locking block 804 may slide at the rear compartment frame edge 500, and an inclination angle of the support bar 801 may be adjusted to support the cover plate 600 obliquely.

The folding mechanism 700 includes a first folding connecting component 701 and a second folding connecting component 702. The first folding connecting component 701 includes a strip-shaped folding connecting portion 710 that is bendable in a width direction and first cover plate sealing strips 720 that are respectively and integrally connected to two long sides of the folding connecting portion 710, opposite sides of the fixed frames of the two adjacent cover plates 600 are provided with sealing cavities 730 corresponding to the first cover plate sealing strips 720, the two first cover plate sealing strips 720 are respectively and correspondingly embedded in the two relatively close sealing cavities 730 of the two adjacent cover plates 600, the folding connecting portion 710 is a rubber sheet body 711, and the first cover plate sealing strips 720 are also made of a rubber material.

The second folding connecting component 702 includes a rectangular connecting plate 712 and connecting sealing strips 713 that are respectively and hermetically connected to two long sides of the connecting plate 712, the two long sides of the connecting plate 712 are respectively provided with sealing embedding grooves 714, the connecting sealing strip 713 includes a folding portion and a sealing portion 7131 that is connected to a side of the folding portion, the other side of the folding portion is integrally connected to the cover plate sealing strip 720, the sealing portion 7131 is correspondingly embedded in the sealing embedding groove 714, the sealing cavity 730 is a long groove that is disposed on a side wall of the cover plate 600 and that has an opening facing upward, the opening is provided with a baffle 715 that is fixedly connected to the cover plate 600, there is a gap between a side groove wall of the long groove that is away from the cover plate 600 and the baffle 715, the cover plate sealing strip 720 is embedded in the long groove, and the folding connecting portion 710 is integrally connected to the cover plate sealing strip 720 through the gap.

In the rear compartment cover system for a pickup truck in this embodiment, three cover plates 600 are connected in turn, and are laid flat to seal the top opening of the rear compartment cover of the pickup truck. In this case, the limiting block 200 of the limiting structure on the bottom of each of the cover plates 600 extends out of the limiting base 110, and a top surface of the limiting block 200 abuts against the bottom of the rear compartment cover frame edge 500 to play a role of limiting, so that the cover plate 600 may stably seal the opening of the rear compartment cover of the pickup truck. The three cover plates 600 are set as a first cover plate, a second cover plate, and a third cover plate in turn from the rear to the front of the pickup truck. The first cover plate and the second cover plate are connected by using a first folding connecting component 701, and the second cover plate and the third cover plate are connected by using a second folding connecting component 702. When the rear compartment cover system is to be opened, the handle 320 at the bottom of the first cover plate is rotated to make the limiting block 200 retract to the limiting base 110, and the first cover plate may be turned over by 180 degrees, so that the first cover plate is stacked on the top of the second cover plate, and then the handle 320 at the bottom of the second cover plate is rotated. Similarly, the first cover plate and the second cover plate that are stacked together may be turned over at the same time, so that the first cover plate and the second cover plate are simultaneously stacked on the top of the third cover plate. Finally, the three cover plates 600 that are stacked together continue to be turned over, so that the three cover plates 600 are all placed vertically and accommodated on the top of the rear compartment cover that is close to the front of the vehicle, and then the three vertically placed cover plates 600 are supported and mounted through the support structure, thereby increasing the size of the opening of the rear compartment cover and helping people to take out or place goods.

The above embodiments are exemplary embodiments of this application, but the scope of protection of this application is not limited thereto. Therefore, all equivalent changes made in accordance with the structure, shape, and principle of the present disclosure shall be covered by the scope of protection of the present disclosure.

What is claimed is:

1. A limiting structure, comprising:
a mounting base;
two limiting blocks separately arranged on two sides of the mounting base and movably connected to the mounting base;
a pulling member driving the two limiting blocks to retract toward the mounting base; and
a springback member driving the two limiting blocks to extend in a direction away from the mounting base, wherein:
the pulling member comprises a handle rotatably mounted on the mounting base and a pull rope connected to the handle,
two ends of the pull rope are respectively connected to the two limiting blocks,
the handle comprises a rotating block and a grip connected to a side wall of the rotating block and overhanging outward,
the rotating block is rotatably mounted inside the mounting base,
the rotating block is provided with a pull rope limiting channel that penetrates the rotating block along a length direction of the pull rope,
the pull rope partially passes through the pull rope limiting channel,
the mounting base comprises two limiting bases and a rotating base located between the two limiting bases,
each of the two limiting bases is provided with a limiting cavity that penetrates two sides and is used to mount each of the two limiting blocks,
the rotating base is provided with a rotating cavity that penetrates two sides and is used to mount the rotating block, the rotating cavity and two limiting cavities are arranged coaxially, a bottom cavity wall of the rotating cavity is vertically provided with a connecting shaft, the rotating block of the handle is rotatably connected to the connecting shaft to make the rotating block rotate around the connecting shaft, and a side cavity wall of the rotating base that is axially parallel to the connecting shaft is provided with a side hole from which the grip of the handle extends out.

2. The limiting structure according to claim 1, wherein:

a first end of a first limiting block that is close to the rotating base is movably connected to the limiting base;

a second end of a second limiting block that is away from the rotating base is set as a limiting end capable of moving in-out of the limiting cavity; and an end of the pull rope is connected to a part on the first limiting block close to the limiting end.

3. The limiting structure according to claim 1, wherein:

the springback member comprises a spring and a spring stopper;

the spring stopper is disposed on a side of the limiting block that is close to the rotating base;

an end of the pull rope that is away from the handle movably passes through the spring stopper to connect to the limiting block;

the spring is configured to sleeve on the pull rope; and two ends of the spring are configured to respectively abut against the spring stopper and the limiting block.

4. The limiting structure according to claim 3, wherein:

the springback member further comprises a torsion spring;

a body of the torsion spring is rotatably sleeved on the connecting shaft and is located between the connecting shaft and the rotating block;

a connecting leg of the torsion spring is connected to the rotating block; and the other connecting leg of the torsion spring is connected to the connecting shaft.

5. The limiting structure according to claim 1, wherein:

two ends of the rotating base are respectively connected to two opposite ends of the two limiting bases, so that the rotating cavity communicates with the limiting cavities of the two limiting blocks.

6. The limiting structure according to claim 1, wherein:

the rotating base comprises a first half housing and a second half housing that are configured to be aligned and fixedly connected;

one end of the connecting shaft is vertically and fixedly connected to a bottom wall of the first half housing; and the other end of the connecting shaft extends toward the second half housing.

7. The limiting structure according to claim 6, wherein:

the rotating base further comprises two connecting blocks;

the connecting blocks are provided with insertion cavities along an axial direction of the rotating cavity;

two ends of the first half housing and the second half housing that are aligned are respectively inserted into the insertion cavities of the two connecting blocks; and an end of each connecting block that is away from the rotating base is inserted with an end of the limiting base that faces the rotating base.

8. The limiting structure according to claim 1, wherein:

two handles are provided;

the two handles are spaced apart and rotatably mounted on the rotating base; and the pull rope is simultaneously connected to the two handles.

9. A rear compartment cover system for a pickup truck, the rear compartment cover system comprising:

a plurality of cover plates connected in turn by using at least one folding member; and a bottom surface of each of the cover plates is provided with a limiting structure configured to connect to a rear compartment frame edge for limiting, the limiting structure comprising:

a mounting base, two limiting blocks separately arranged on two sides of the mounting base and movably connected to the mounting base, a pulling member driving the two limiting blocks to retract toward the mounting base, and a springback member driving the two limiting blocks to extend in a direction away from the mounting base, wherein:

the pulling member comprises a handle rotatably mounted on the mounting base and a pull rope connected to the handle, two ends of the pull rope are respectively connected to the two limiting blocks, the handle comprises a rotating block and a grip connected to a side wall of the rotating block and overhanging outward, the rotating block is rotatably mounted inside the mounting base, the rotating block is provided with a pull rope limiting channel that penetrates the rotating block along a length direction of the pull rope, the pull rope partially passes through the pull rope limiting channel, the mounting base comprises two limiting bases and a rotating base located between the two limiting bases, each of the two limiting bases is provided with a limiting cavity that penetrates two sides and is used to mount each of the two limiting blocks, the rotating base is provided with a rotating cavity that penetrates two sides and is used to mount the rotating block, the rotating cavity and two limiting cavities are arranged coaxially, a bottom cavity wall of the rotating cavity is vertically provided with a connecting shaft, the rotating block of the handle is rotatably connected to the connecting shaft to make the rotating block rotate around the connecting shaft, and a side cavity wall of the rotating base that is axially parallel to the connecting shaft is provided with a side hole from which the grip of the handle extends out.

10. The rear compartment cover system according to claim 9, wherein:

the at least one folding member comprises a folding connecting portion that is bendable in a width direction and two cover plate sealing strips that are respectively and integrally connected to two long sides of the folding connecting portion;

opposite sides of two adjacent cover plates are provided with sealing cavities corresponding to the two cover plate sealing strips; and the two cover plate sealing strips are configured to be respectively and correspondingly embedded in the sealing cavities on the two adjacent cover plates.

11. The rear compartment cover system according to claim 10, wherein:
the folding connecting portion comprises a rubber sheet body; and
two long sides of the rubber sheet body are respectively and integrally connected to the two cover plate sealing strips.

12. The rear compartment cover system according to claim 10, wherein:
the folding connecting portion comprises a rectangular connecting plate and two connecting sealing strips that are respectively connected to the two long sides;
two long sides of the connecting plate are respectively provided with sealing embedding grooves;
each of the two connecting sealing strips comprises a folding portion and a sealing portion that is connected to a side of the folding portion;
the other side of the folding portion is integrally connected to the cover plate sealing strip; and
the sealing portion is correspondingly embedded in the sealing embedding groove.

13. The rear compartment cover system according to claim 10, wherein:
the sealing cavity is a long groove that is disposed on a side wall of the cover plate and that has an opening facing upward;
the opening is provided with a baffle that is fixedly connected to the cover plate,
a gap is disposed between a side groove wall of the long groove that is away from the cover plate and the baffle;
the cover plate sealing strip is embedded in the long groove; and
the folding connecting portion is integrally connected to the cover plate sealing strip through the gap.

* * * * *